Oct. 27, 1970
J. O. JEFFREY
3,535,871
METHOD FOR MAKING CHAIN LINKS
Filed Aug. 15, 1966
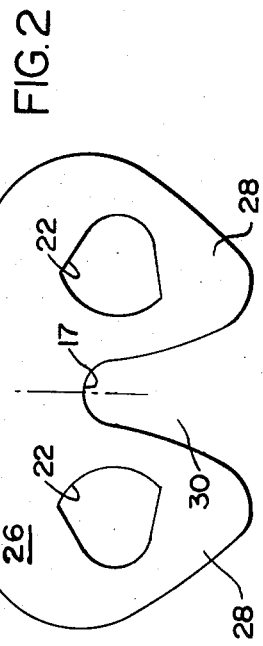
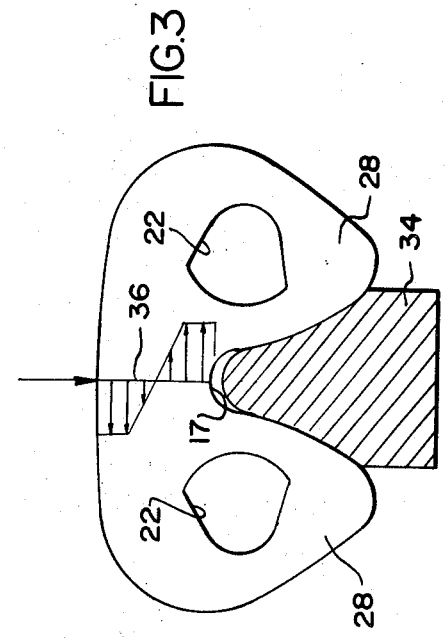
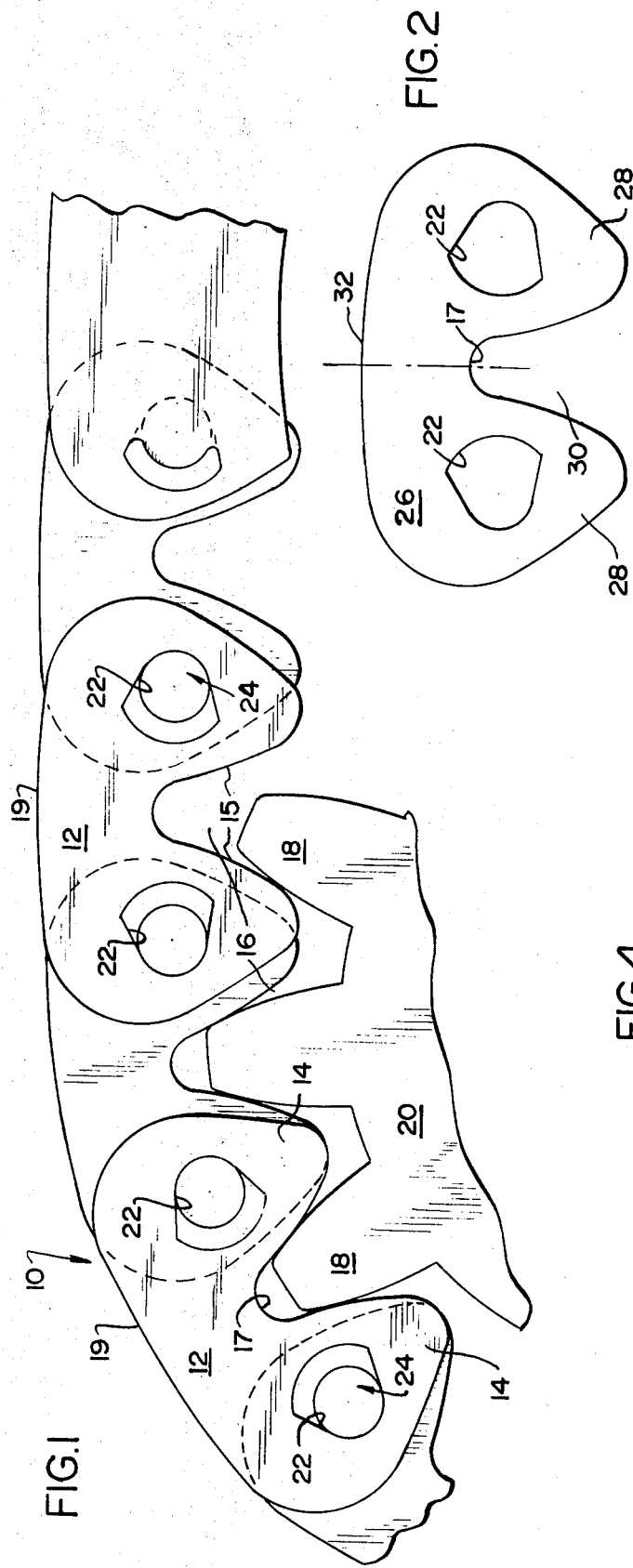
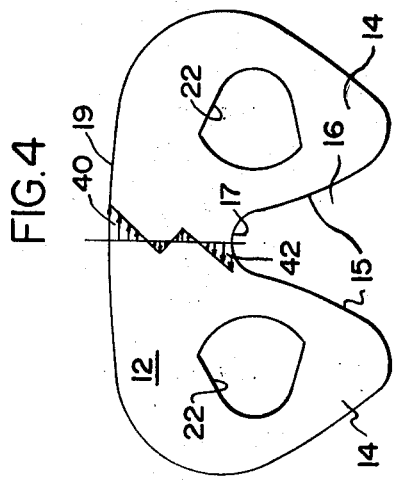
INVENTOR
JOSEPH O. JEFFREY
BY Evan D. Roberts
ATTORNEY

United States Patent Office 3,535,871
Patented Oct. 27, 1970

3,535,871
METHOD FOR MAKING CHAIN LINKS
Joseph O. Jeffrey, Ithaca, N.Y., assignor, by mesne assignments, to Borg-Warner Corporation, Chicago, Ill., a corporation of Delaware
Filed Aug. 15, 1966, Ser. No. 572,590
Int. Cl. B21l 9/04
U.S. Cl. 59—8                               2 Claims

ABSTRACT OF THE DISCLOSURE

A chain link for an endless drive chain having improved fatigue characteristics in the crotch area. The disclosure relates to a method for making the chain link, the method involving spreading the teeth of the link blank to produce an internal bending stress and allowing the teeth to return to the desired positions.

---

This invention relates to chain links, and, more particularly, to a chain link adapted to form a part of an endless drive chain for power transmissions and the like. The invention also relates to a method for making the chain link of the invention.

The invention is concerned with improved chain links of the inverted tooth type in which the link teeth are delineated by a recess bounded by the inside flanks of the teeth and the crotch of the link. Applicant has found that service failures of this type of chain generally occur by fatigue, characterized by the initiation of a crack on the surface of a link in the region of the crotch. The crack then propagates into one of the link apertures or through the waist of the link until the remaining cross-section diminishes to the point where it can no longer transmit the chain load and final fracture occurs without warning. It is, accordingly, a principal object of the invention to provide an improved chain link with enhanced resistance to fatigue failures initiating in the region of the crotch.

Another object of the invention is to provide a chain link which is characterized by favorable internal residual stresses on the surface of the crotch portion and extending outward therefrom along the inside flanks of the teeth of the link.

A further object of the invention is to provide a chain link of a particular design in which the improved fatigue characteristics are achieved without altering the form or configuration of the finished link, the material from which it is made, or the manufacturing and processing operations normally involved heretofore in the production of the chain link.

An additional object of the invention is to provide improved fatigue resistance and power transmission capacity without increasing the mass of the chain link.

A further object of the invention is to provide a more fatigue resistant chain link which can be made interchangeable with the links of existing inverted tooth type chains.

A further object of the invention is to provide a chain link in which fatigue resistance is further enhanced by providing a surface on the inner flanks of the teeth which is smooth, hard and burnished.

Another object of the invention is to provide, for inside engagement chains, a chain link having a more precise contour on the inside flanks of its teeth thereby improving the engagement characteristics between the chain link and sprocket teeth.

A further object of the invention, also applicable to inside engagement chains, is to provide smooth, hard and burnished surfaces on the inside flanks of the teeth of the link, thereby improving the wear resistance of the chain.

A further object of the invention is to devise a method for making an improved chain link.

Other and more particular objects and advantages of the present invention will be apparent from the following detailed descriptions and the attached drawings, wherein:

FIG. 1 is a fragmentary elevational view illustrating a section of power transmission chain made in accordance with the present invention and illustrated in operative relation to a sprocket;

FIG. 2 is an elevational view illustrating the blank from which one of the links of FIG. 1 is formed;

FIG. 3 shows the blank as it appears in position on the forming die, the function of which is to spread the teeth of the blank far enough apart, when a force is applied on top of the blank, to produce the internal bending stress pattern illustrated across the waist of the links; and, FIG. 4 is an elevational view illustrating one of the links of FIG. 1 in its finished form and containing the residual stress pattern illustrated diagrammatically across the waist portion of the link after springing back to the desired final dimensions.

Referring to the drawing, and more particularly to FIG. 1, there is illustrated therein an endless power transmission chain indicated generally by reference numeral 10 and including a plurality of interleaved series of links 12 each having a pair of substantially symmetrical teeth 14 whose inner flanks 15 terminate in a crotch 17 of the link, said inner flanks 15 and the crotch 17 thereby delineating a recess space 16 between the teeth 14. Each link 12 has an edge 19 which is illustrated in FIGS. 1 and 4 as being slightly crowned. FIG. 3 illustrates a link blank of the type shown in FIG. 2 and in the configuration it temporarily assumes during the forming operation according to the present method. In that condition the top portion is illustrated as being somewhat flattened, and the recess space between teeth 28 is dilated by the forming die 34 forcing the teeth 28 outward thereby making the recess space temporarily greater than the recess space 16 of link 12. It will be appreciated that the top portion 32 of link blank 26 may be assigned other configurations and the condition it temporarily assumes during the forming process is irrelevant. Each series of links is hingedly connected to an adjacent series of similar links in order to permit articulation of the chain around sprocket 20. The chain, as illustrated, is adapted for engagement by teeth 18 of a sprocket 20 against the inner flanks 15 of the chain link teeth 14. By suitably enlarging the recess space 16 between the teeth 14 of the links, it is apparent that engagement could be effected between sprocket teeth 18 and the outer flanks of chain link teeth 14. Each of the links 12 is provided with a pair of apertures 22 for reception of a suitable pintle assembly 24, an example of which is illustrated in FIG. 1.

According to the present invention, each link 12 is initially formed as a blank 26 illustrated in FIG. 2. The blank 26 has essentially the same basic configuration as that of the finished link 12 except that the linear distance between the bottom tips of the teeth 28 in blank 26 is shorter than the distance between the same tooth tip points in the finished link 12. Thus, the recess space 30 delineated by the crotch 17 and inner flanks of the teeth 28 in blank 26 is smaller than the recess space 16 of the link 12. The blank 26 has a pair of apertures 22 which are identical with the apertures 22 in the finished link 12, as illustrated in FIGS. 1 and 4. Under certain manufacturing conditions, the operation of forming the finished link 12 from the blank 26 may be facilitated by providing top surface 32 of blank 26 with a convex curvature, as illustrated in FIG. 2, although this configuration is not essential to the fulfillment of the inventor's basic objectives.

According to the method of the present invention, the link blank 26 is modified by a cold-forming operation which temporarily enlarges the recess space 30 by a predetermined amount greater than the desired recess space 16 of the finished link 12. Removal of the cold-forming forces permits the deformed blank to spring back to the desired final shape of the link 12, at the same time inducing favorable residual compressive stresses in the critical region of the crotch 17, thereby enhancing the fatigue endurance strength of the link.

The temporary enlargement of the recess space described above is best illustrated in FIG. 3, which shows the residual-stress-forming die 34 in position between teeth 28, while a force is applied on the top of the blank, the downward movement of which causes the teeth 28 to be forced outward. The configuration of the die 34 and the extent of downward movement of the link blank thereon are chosen to permanently deform the blank by the amount necessary to induce the desired residual compressive stresses in the crotch region of the link upon removal of the deforming force and concomitantly to obtain the required final shape of the link 12. During the application of the deforming force, the upper portion of the link blank between the crotch 17 and top portion 32 is subjected to bending stresses, the relative magnitude and distribution of which are shown diagrammatically by the stress pattern 36 in FIG. 3. The portion toward the crotch is subjected to tensile stresses in excess of the yield strength of the material, while compressive stresses prevail in the portion nearer the top portion 32.

FIG. 4 illustrates the finished link 12, which, upon removal of the deforming force, has the required configuration as well as the desired residual stresses, the relative magnitude and distribution of which are shown diagrammatically by the stress pattern 40–42. Around the crotch 17, where fatigue cracks would originate, favorable residual compressive stresses 42 now prevail, balanced by tensile stresses 40 near the top 19 of the link 12.

Because the inner flanks 15 of the teeth 14 of link 12 have been formed by sliding under pressure on the faces of the residual-stress-forming die 34 in FIG. 3, these inner flanks will have a more precise contour than can be achieved by conventional forming methods, e.g., blanking. In addition, the inner flanks 15 of the teeth 14 of link 12 will have smooth, hard, burnished surfaces, free of burrs, also attained by sliding under pressure on the faces of forming die 34. In chain drives designed to have the sprocket teeth engage the inner flanks of the chain link teeth, all of the above features would be especially desirable as they contribute to a smooth running chain with reduced wear and noise.

Due to the wedging action of the residual-stress-forming die 34 between the teeth 28, only relatively small forces are required to produce the required displacement of the teeth in the forming operation shown by FIG. 3. Such forces may be effected by hand tools, such as a hammer, vice, arbor press or the like, or by a power driven reciprocating die. Another feasible method would be to run an assembled chain over a sprocket having suitably enlarged teeth while pressing a roller down on the top of the chain directly over the sprocket, thereby forcing the links down far enough on the enlarged sprocket teeth to effect the desired link tooth displacement.

The method of the present invention involves the steps of:

(a) Forming a link blank having at one side thereof a pair of teeth with inner flanks which terminate in a crotch, the inner flanks and crotch delineating a recess space between the teeth, the linear distance between the tips of said teeth being less than that desired in the finished link;

(b) Applying a cold-forming operation on said link blank whereby the teeth are forced outward causing the linear distance between the tips of the teeth to exceed that desired in the finished link; and (c) Determining the extent of prestressing by measuring the extent of penetration of said die; and (d) Terminating the cold-forming operation at a point which allows the temporarily deformed link blank to spring back to teh desired final dimensions and configuration of the finished link and having induced therein favorable residual compressive stresses in the critical region of the crotch thereby enhancing the fatigue strength of the link.

It will be appreciated by those skilled in the art that the steps described above must be performed subsequent to any heat treatment of the link in order to retain the favorable residual stresses induced therein. It would be appreciated also that the extent of prestressing may be determined by the magnitude of the cold-forming force. In other words, the extent of prestressing is a function of the force exerted.

As a means of producing a more accurately sized and precisely shaped contour delineating the recess space of the link blank prior to heat treatment, the method of the present invention may be utilized in the following manner:

(a) Forming a link blank preform having at one side thereof a pair of teeth with inner flanks which terminate in a crotch delineating a recess space between the teeth, the linear distance between the tips of said teeth being less than that desired in the finished link blank;

(b) Applying a cold-forming operation on said link blank preform whereby the teeth are forced outward causing the linear distance between the tips of the teeth to exceed that desired in the finished link blank; and (c) Terminating the cold-forming operation at a point which allows the temporarily deformed link blank preform to spring back to the desired final dimensions and configuration of the link blank.

Heat treatment of this link blank would alleviate or remove any residual stresses therein, after which the steps described in the preceding paragraph would be applied to attain the finished residually stressed link having enhanced resistance to fatigue failures in the region of its crotch, together with precision inner flank contours of superior smoothness and hardness.

The amount of prestress may be readily determined by measuring the force applied to the link.

The invention contemplates the extension of the forming die fully into the crotch when the force is applied on the link to spread the teeth. By this expedient more precise shaping of the link may be effected and additional cold working may be provided by upsetting the crotch.

The chain link of the present invention exhibits superior resistance to failure in the critical area around the crotch, where fatigue cracks are most likely to originate. Applicant has found that there is no deleterious distortion of the remainder of the link due to the residual-stress-forming operation. The apertures 22, for example, are identical before and after the forming operation. The method of the present invention is simple, inexpensive, and capable of being performed by inexperienced help.

Applicant does not intend to be limited by the above descriptions, but intends to be limited only by the scope of the appended claims.

I claim:

1. A method for making a chain link, which includes the following steps:

(1) forming a link blank having at one side thereof a pair of teeth with inner flanks which terminate in a crotch, said inner flanks and crotch thereby delineating a recess space between said teeth, the linear distance between the tips of said teeth being less than that desired in the finished link, (2) applying a cold-forming operation on said link blank whereby the teeth are forced outward causing the linear distance between the tips of said teeth to exceed that desired in the finished link, and (3) terminating the cold-forming operation at a point which permits the temporarily deformed link blank to spring back to the desired dimensions and configuration of the finished link, thereby inducing favorable residual compressive stresses in the critical region of the crotch and enhancing the fatigue endurance strength of the link.

2. A method for making a chain link, which includes the following steps:
  (1) forming a link blank preform having at one side thereof a pair of teeth with inner flanks which terminate in a crotch, said inner flanks and said crotch thereby delineating a recess space between said teeth, the linear distance between the tips of said teeth being less than that desired in the finished link blank;
  (2) applying a cold-forming operation to said link blank preform whereby the teeth are forced outward causing the linear distance between the tips of said teeth to exceed that desired in the finished link blank;
  (3) terminating the cold-forming operation at a point which permits the temporarily deformed link blank preform to spring back to the desired dimensions of the finished link blank;
  (4) heat treating said link blank.

References Cited

UNITED STATES PATENTS

| | | | |
|---|---|---|---|
| 1,094,200 | 4/1914 | Dodge | 74—250 |
| 1,670,278 | 5/1928 | Belcher | 74—250 |
| 1,865,844 | 7/1932 | Dull | 59—8 |
| 1,952,885 | 3/1934 | Oakes | 74—250 |

CHARLES W. LANHAM, Primary Examiner

G. P. CROSBY, Assistant Examiner

U.S. Cl. X.R.

74—250